United States Patent [19]
Erickson

[11] 3,762,761
[45] Oct. 2, 1973

[54] LIFT TRUCK

[75] Inventor: Dennis E. Erickson, Battle Creek, Mich.

[73] Assignee: Clark Equipment Company, Buchanan, Mich.

[22] Filed: Apr. 26, 1971

[21] Appl. No.: 137,370

[52] U.S. Cl. ............................. 296/107, 280/150 C
[51] Int. Cl. .............................................. B60j 7/24
[58] Field of Search ................ 280/150 C; 296/102, 296/107, 108

[56] References Cited
UNITED STATES PATENTS

| | | | |
|---|---|---|---|
| 3,259,211 | 7/1966 | Ryskamp | 280/150 C |
| 3,472,550 | 10/1969 | Marco | 280/150 C |
| 3,502,368 | 3/1970 | Maxa | 296/102 |
| 3,188,111 | 6/1965 | Ells | 296/102 |

Primary Examiner—Leo Friaglia
Assistant Examiner—Robert R. Song
Attorney—Kenneth C. Witt, John C. Wiessler, Robert H. Johnson, Lewis J. Lamm and Robert J. Norton

[57] ABSTRACT

An overhead guard and battery tray assembly for lift trucks in which the overhead guard extends over the operator's station and in upright side view is of a generally T-shaped configuration. The vertical leg on each side of the guard has a lower leg portion rigidly secured to the truck in the central portion thereof and an upper leg portion pivotally secured to the lower leg which supports one side of the guard canopy. The pair of upper leg portions are pivotable with the guard canopy both forwardly and rearwardly of vertical position. The guard assembly is secured to a truck body portion which includes a rearwardly extending battery tray or plate for supporting the battery of an electric lift truck on the chassis of the truck.

18 Claims, 4 Drawing Figures

PATENTED OCT 2 1973 3,762,761

INVENTOR
DENNIS E. ERICKSON
BY
ATTORNEY

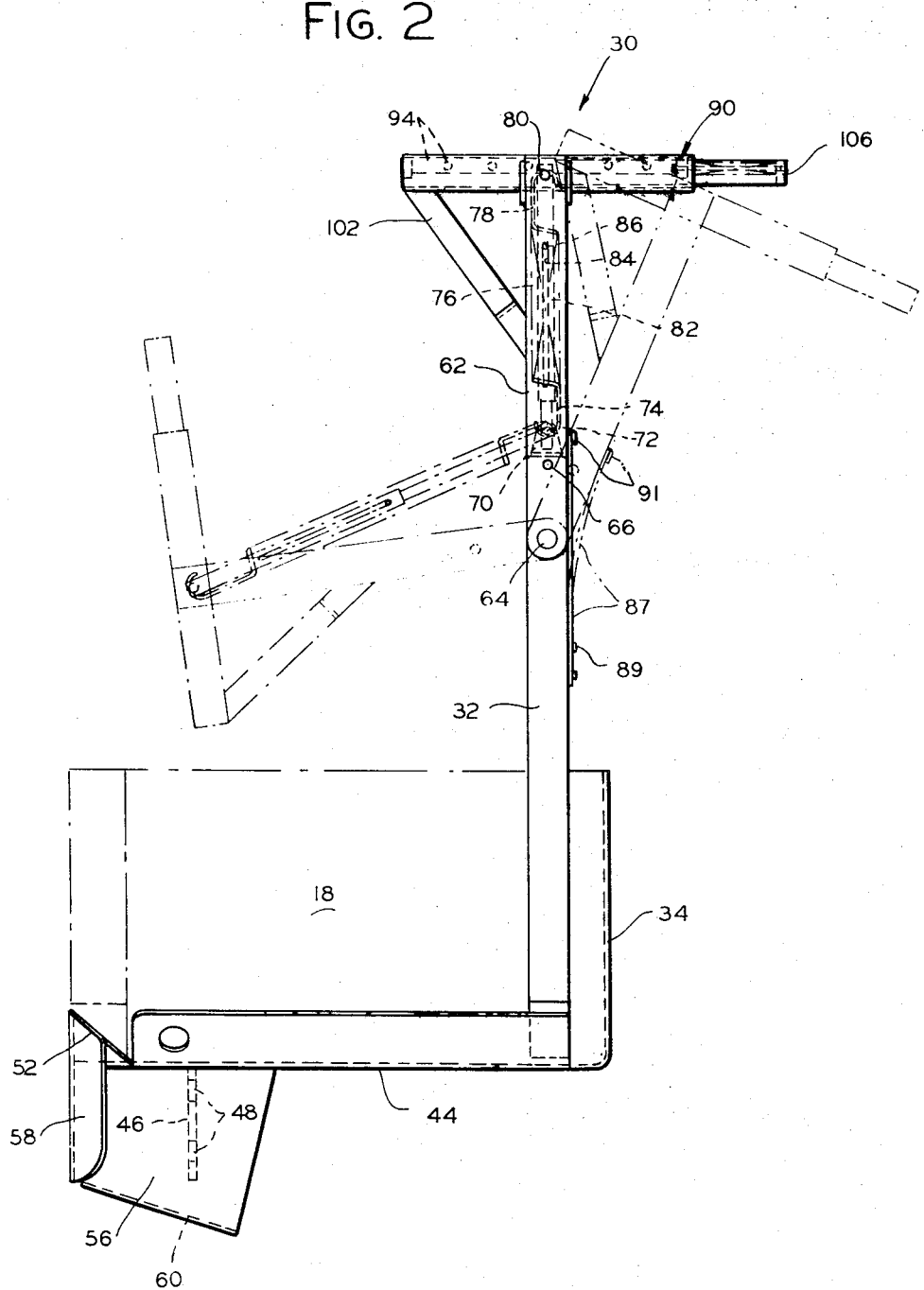

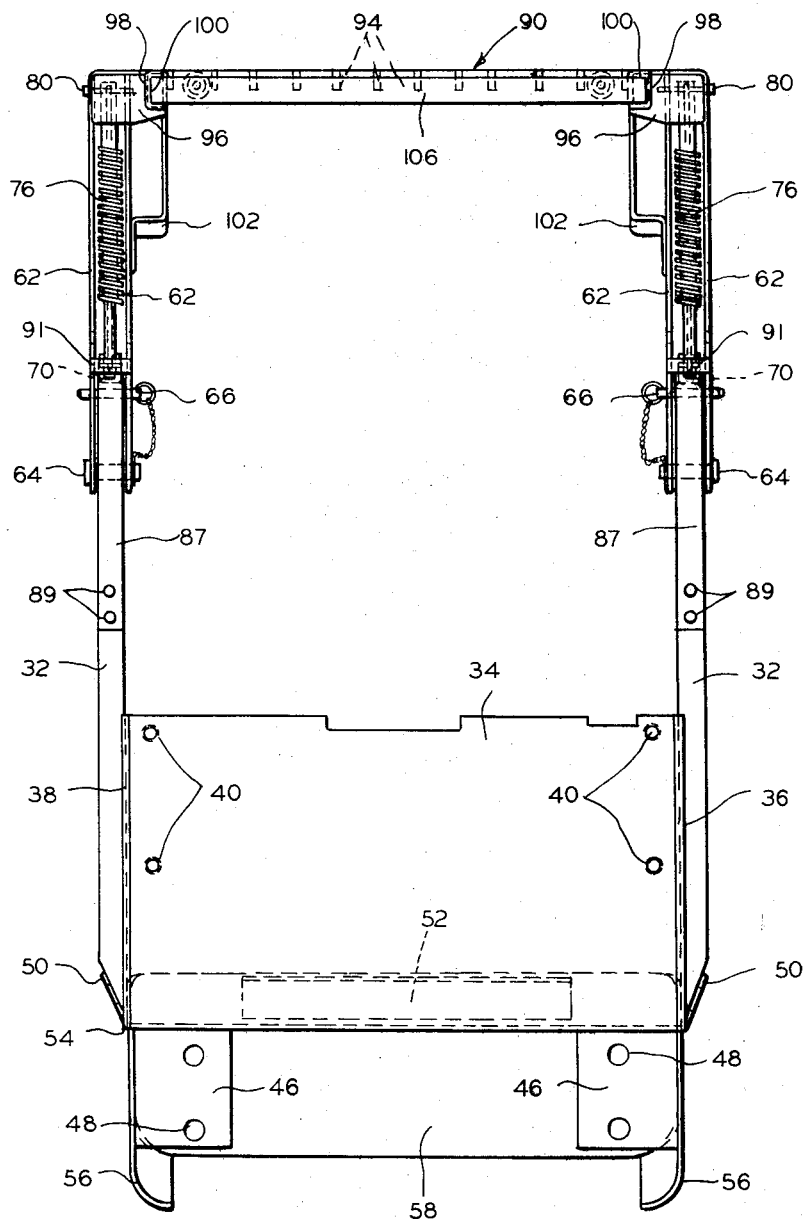

3,762,761

LIFT TRUCK

BACKGROUND OF THE INVENTION

The field of art to which this invention relates includes overhead safety devices for material handling vehicles.

It is the usual practice to equip lift trucks with overhead guards to protect the operator in case a load accidentally falls from a point above. The guard, of course, must extend over the operator's compartment at a height sufficient to provide adequate head clearance for the operator and without unnecessarily interfering with his ready access to and exit from the truck. On the other hand, a number of lift truck applications involving, for example, operation in and out of freight cars, in ships' holds, and the like, require a lower overall truck height than can be provided when such a guard is in an operative upright position.

As a consequence of such conflicting requirements various means have been implemented heretofore to solve the problem. In some prior overhead guard designs the common inverted U-shaped guard configuration is utilized having a pair of legs secured to each side of the truck with an overhead portion or canopy secured to the legs and retractable to a non-operative position in which the overall height of the truck is substantially reduced. In others which may be particularly adapted for use with battery-powered lift trucks for use in the holds of ships and the like, rigid T-shaped or inverted L-shaped guards have been provided which are mounted in non-retractable but detachable manner from a rear counterweighted battery assembly located in the rear portion of the truck and detachable therefrom as a unit from the truck chassis. The overhead guard in some cases may be detached readily from the truck either as a separate component or in combination with the battery and counterweight assembly. When the entire said assembly is removable from the truck battery charging and replacement is facilitated to keep the truck in operation; also, locating and removing a truck to and from the hold of a ship, for example, is facilitated inasmuch as the lift truck can be more readily handled by ship booms and the like as two separate units which can be quickly reassembled either in the ship's hold or on the dock.

One of the important objectives in any such lift truck design is to minimize the conflict inherent in the use of an overhead guard on a truck which is used only some of the time in low overhead operations in which provision must be made to remove or otherwise render inoperative the guard.

SUMMARY OF THE INVENTION

This invention comprises a substantial improvement over prior overhead guards for the present purpose, in the provision of a retractable and forwardly pivotable guard having only one upright leg on each side of the truck which is retractable rearwardly of the truck with the overhead canopy of the guard. When in retracted position the outer boundaries of the guard remain essentially within the outer boundaries or dimensions of the truck; the guard is also pivotable forwardly of its operative position so as to enable easy access to the rear portion of the truck which facilitates installation and removal of the main battery in a vertical direction extending above the truck. The guard is preferably of a T-shape or configuration but in some circumstances depending upon the nature of the overall truck design it may be of a generally inverted L-shape or configuration. The guard is also preferably rigidly attached to a rearwardly extending body portion of the truck which is beneath the main battery and on which the battery is located. It is, therefore, a main object of my invention to provide an improved overhead guard for a lift truck in which two main vertical support legs only are provided one on each side of the truck, and wherein lower portions of said legs are rigidly secured to the truck while upper portions thereof are pivoted from the lower legs such that the operative portion of the guard can be retracted to an inoperative and non-interfering height in low overhead truck operations while remaining essentially within the envelope dimensions of the truck.

Another important object is to provide an overhead guard for lift trucks having only two vertical support legs, the upper portions of which are pivotable forwardly of rigid lower portions thereof providing for vertical access to the prime mover or source of energy for operating the truck.

Another object of the invention is to provide a unit construction of a rearwardly extending lower body portion with an overhead guard.

It is a feature of my invention to provide a signalling device as a part of the overhead guard structure by which the operator perceives any contact of the forward end of the guard with any structure extending above the truck with the guard in operative vertical position.

Another important object of the invention is to provide a retractable and forwardly pivotable overhead guard structure for lift trucks usable in low overhead applications and in which the guard has two main vertical support legs only.

BRIEF DESCRIPTION OF THE DRAWING

FIG. 2 is an enlarged side elevational view of the integrated overhead guard and body construction of FIG. 1, showing the upper guard portion in three positions of adjustment;

FIG. 3 is a front elevational view of FIG. 2; and

DESCRIPTION OF THE PREFERRED EMBODIMENT

Figure 1:
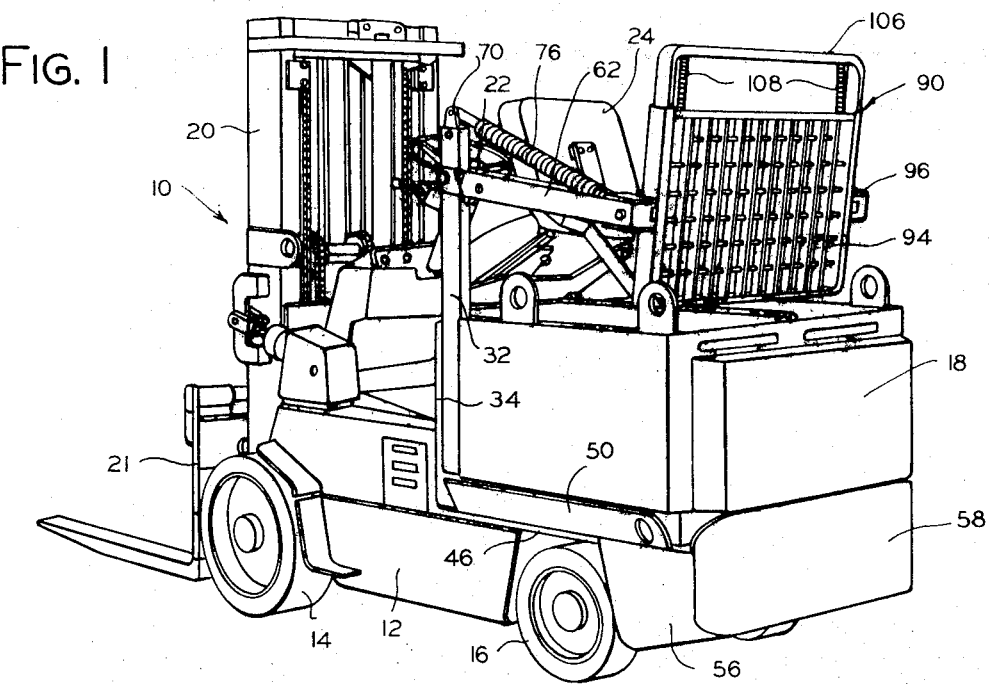
FIG. 1 is a left rear quarter perspective view of a lift truck embodying my invention.

Referring now to the drawing, numeral 10 indicates an industrial lift truck which includes a body and frame portion indicated generally at numeral 12 mounted suitably upon front drive wheels 14 and rear steer wheels 16, a counterweight and battery assembly 18, a mast structure 20 mounted on the front axle of the truck, and a lifting fork and carriage 21 mounted for elevation in the mast 20.

An operator's station includes a steer wheel 22, a seat 24, and a plurality of control levers and pedals which enables the operator to control in known manner the forward and rearward motions of the truck, and the operation of the mast 20 and fork carriage 21.

Within the body of the truck is mounted the main power plant and accessories associated therewith for operating the truck. An electric motor driven truck is shown in the rear upper body portion and behind the seat of which is located the battery and counterweight assembly.

An assembly of an overhead guard and body portion is illustrated generally at numeral 30. It includes a pair of transversely spaced upstanding lower rigid leg members 32 secured, as by welding at 36 and 38, to the opposite edges of the legs of a U-shaped forward plate assembly 34. The transverse plate of said U-shaped plate assembly is secured, as by bolting at 40, to a vertical transversely extending frame member, not shown, and the said U-shaped plate assembly is preferably made integral with a rearwardly extending horizontal battery tray portion 44. The latter rests upon transversely spaced and rearwardly extending truck frame portions 46 which in turn support the battery and counterweight assembly 18. The assembly of battery tray 34 and 44 is effected by a pair of transversely spaced plates 46 depending downwardly from the battery tray and having openings 48 therein which are alignable with corresponding openings in a transverse truck frame member, not shown, said plate portions 46 being therein bolted to the truck frame.

The counterweight and battery 18 merely rests upon the battery tray and is maintained in correct position thereon by a pair of longitudinal and upwardly diverging guide plates 50 and an upwardly and rearwardly extending transverse guide plate 52, the three said guide plates combining with forward plate 34 to precisely position the counterweight and battery assembly on the battery tray while permitting deviations from said precise position during deposit on and removal from the battery tray. The said guide plates are secured along the lower edges 54 to the battery tray as shown.

Downwardly depending fender portions 56 form with a rearwardmost transverse plate 58 a generally U-shaped forwardly opening plate assembly which provides a rear wheel guard or fender portion and a transverse apron at the rear of the truck. A pair of transversely spaced stiffening plates 60 are located in the opposite corner portions of the U-shaped fender and apron plate assembly 56, 58. The counterweight and battery assembly can be loaded on and unloaded from the battery tray by overhead crane or other suitable means.

A pair of rigid upper leg members 62 are pivotally connected to the lower leg members 32 at a pair of transversely aligned and spaced pivot pins 64 which are located a substantial distance below the upper ends of the lower leg members 32. The lower leg members are preferably hollow rigid metal members of rectangular cross section while each upper leg member comprises a pair of parallel plates adapted to straddle the respective ones of the lower leg members and normally located in upstanding rigid alignment with the latter members by pull pins 66 which are adapted to register with alignable openings located in the upper ends of the lower leg members and intermediate the ends of the upper leg members. A bifurcated bracket 70 is secured to the upper ends of each leg member 32 and includes a transverse pin 72 for receiving the one hook end 74 of a tension spring 76 which is secured by a hook end 78 at its opposite end to a transverse pin 80 which extends between and is secured to the parallel plate members of each upper leg member 62. A telescoping tubular extension member 82 having an elongated slot 84 through the outer tube and a pin connection 86 securing the inner tube thereto is located interiorly of each tension spring and is also pivoted from pin members 72 and 80 so that each tension spring is maintained in its desired position of tension during operation without buckling. A second spring member 87, which may be of the leaf spring type, is fixedly secured at 89 to each lower leg member 32 and at 91 to the forward edges of the plate forming each upper leg member 62 for a purpose to be described.

Figure 4:
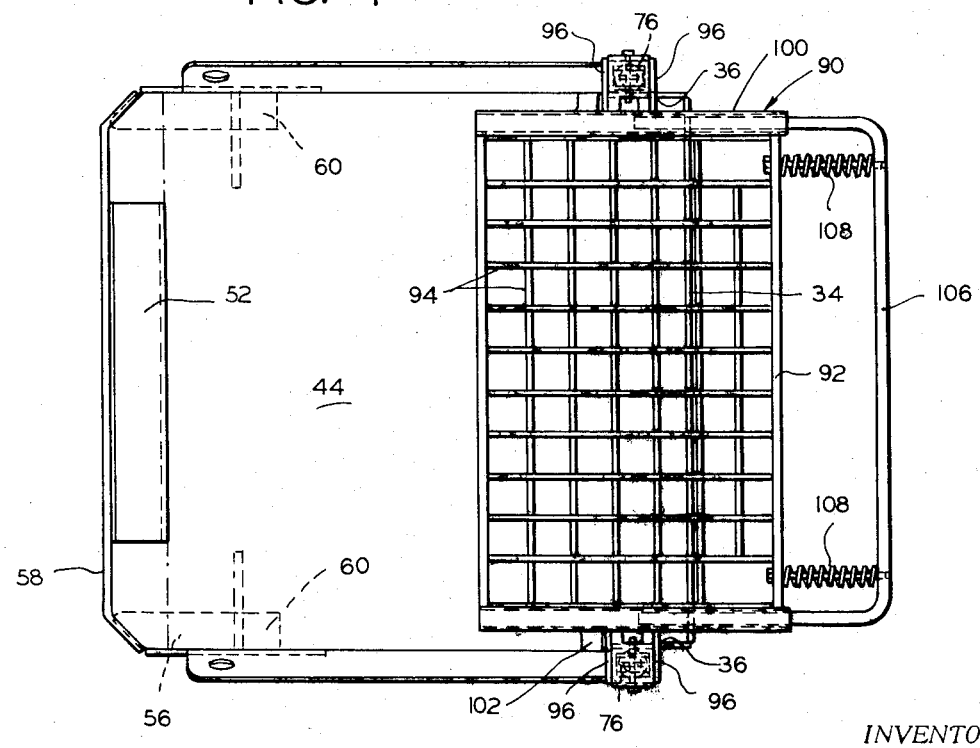
FIG. 4 is a plan view of FIG. 2.

A guard canopy assembly 90 comprises a rectangular or square frame 92 having interior thereof a protective guard grate assembly 94, as best shown in FIG. 4, which has the opposite ends of the respective transverse and longitudinal bar members of the grates secured to the inner sides of the corresponding members of the frame 92. The guard canopy 90 is secured to upper leg members 62 by means of inwardly extending pairs of plate members 96 which are secured to the edges of the plates which form each upper leg member 62, a step portion 98 is formed at the inner ends of each said pair which is welded and conforms to the side of inwardly opening channel members 100 of the canopy frame 92. A pair of diagonally extending and transversely spaced brace members 102 are preferably secured to the edges of the inner plates of leg members 62 and to the rear upper corner portions of canopy 90. Canopy 90 preferably includes a bumper signalling device 106 which is adapted to be telescoped in the opposed channels 100 and is spring urged outwardly by a pair of compression springs 108 secured as shown in FIG. 4 to the base of bumper bar 106 and to the forward canopy frame member.

The upper leg and canopy assembly 62 and 90 may, upon removal of the pins 66, be pivoted either forwardly or rearwardly of its upright position as best shown in FIG. 2. When both the guard and the seat 24 are pivoted forwardly, there is sufficient clearance to remove from the truck in a vertical direction, as by means of an overhead crane or the like, the counterweight and battery assembly. In this regard, it will be noted with reference to FIG. 2 that the upper T-shaped portion of the guard assembly when pivoted forwardly as shown does not overhang in a rearward direction the transverse plane of lower leg members 32. The upper T-shaped guard assembly may be retained in the forward position shown in which spring 87 urges the same to its upstanding position, by inserting pins 66 in the openings of upper leg members 62 when located ahead of the forward sides of leg members 32. When the upper T-shaped guard assembly is pivoted rearwardly to the position shown in FIGS. 1 and 2 each telescopic retainer tube 82 is extended and each tension spring 76 is lengthened as shown. Springs 76 resist such rearward and downward pivotal movement and assist a return forward pivotal movement to an upright position, thereby assisting the operator at all times to manipulate the relatively heavy T-shaped guard portion.

The construction of the guard is such that a desirable degree of assistance for the operator in manipulating the upper guard portion is achieved by the spring connections shown between the upper ends of the respective lower and upper leg members, while at the same time it achieves a novel compactness of design by the pivot connections 64 of the lower ends of the upper leg members to the lower leg members at a location spaced substantially below the upper ends of the lower leg members. This basic relationship of the tension spring and the upper and lower leg members achieves not only adequate assistance for the operator in manipulating the guard, but very importantly it affords adequate overhead clearance for the operator when the guard is in an upright position while maintaining the outer boundaries of the guard when it is in a retracted position essentially within the rear envelope dimensions of the truck. It will be appreciated that this desirable result is achieved in a truck having a relatively short wheel base to facilitate maneuvering in restricted quarters. Important in the latter regard are certain design factors which allow full retraction of the upper guard portion without rearward overhang of the guard in relation to the rear of the truck.

As exemplified in FIGS. 1 and 2 the preferred embodiment of my invention utilizes an in-line or coplanar relationship in a transverse direction of the upper and lower leg members 32 and 62 and of the spring 76 on each side of the guard construction when it is in an upright position. Also, the consequence of spacing pivot 64 beneath the upper end of each leg 32 to which the respective spring 76 is connected, produces a varying triangular relationship between each upper leg member, the spring and the upper portion of the lower leg member as the upper guard portion is retracted to the position of FIG. 2. Similar results can be achieved if spring 76 is connected to the overhead portion of the guard at a location to the rear of the location of pin 80, in which event retraction of the guard effects a generally X-shaped configuration between the upper guard leg member and the spring rather than the triangular relationship specified above. It would not be desirable to connect the upper end of spring 76 to the overhead portion of the guard at a location substantially in front of pin 80 inasmuch as during manipulation of the guard there may occur periods of zero and "negative" assist. The resultant triangular or X-shaped configurations as specified above in respect of certian parts of the guard structure during manipulation is important in the practice of this invention. Where the identified triangular configuration is concerned, it will be noted that during manipulation the one side of the triangle which comprises the spring and tubular extension and the angles between the sides of the traingle are continually changing. Likewise, in respect of the X-shaped configuration as noted above. These changing relationships result from the spacing of pins 64 and 72 on each side of the guard, which spacing is rather critical in the design if desirable operation is to be achieved. The design as illustrated in the drawings has been found to be quite satisfactory. The spacing of pins 64 and 72 effects in addition a relatively strong and rigid retractable overhead guard structure in that the structure is effectively strengthened by the moment arm or length of guard structure existing between the said pivot pins.

When the guard is retracted it is seen that the highest elevation thereof is not above the collapsed height of the mast, thereby allowing operations in confined spaces having a low overhead. This would not be possible if the guard could not be so retracted. Likewise, there is no limitation on minimum steering radius resulting from having the guard in a retracted position since there is no overhang thereof in respect of the rear plane of the truck. The truck may therefore be maneuvered under all conditions of operation without regard to interference of any kind by the overhead guard from above or behind the truck, thereby increasing the versatility and efficiency of such type lift trucks while helping to assure the safety of the operator.

The bumper bar 106 is operative when the upper guard portion is in an operative upright position. It is adapted to signal the operator of any overhead obstruction prior to any damaging impact with the overhead guard as the bumper retracts within channels 100 while compressing springs 108.

Although I have described and illustrated a preferred embodiment of my invention, it will be understood by those skilled in the art that modifications may be made in the structure, form and relative arrangement of parts without necessarily departing from the spirit and scope of the invention. For example, it will be apparent that any suitable extensible means can be readily substituted for spring 76 within the scope of the invention. Accordingly, it should be understood that I intend to cover by the appended claims all such modifications which fall within the scope of my invention.

I claim:

1. An overhead guard for industrial trucks having an operator's station generally centrally of the truck comprising a pair only of transversely spaced upstanding legs mounted from opposite sides and generally centrally of the truck, each of said legs including upper and lower rigid leg portions, each lower leg portion being secured rigidly to the truck and each upper leg portion being connected pivotably to the respective lower leg portion at a location below the upper end of the lower leg portion, extensible means connecting the upper ends of at least one pair of upper and lower leg portions and a guard canopy secured to the upper end portions of said upper leg portions.

2. An overhead guard as claimed in claim 1 wherein said pair of upper leg portions and guard canopy together form an upper guard portion, said upper guard portion being pivotable rearwardly of the lower leg portions to a retracted position in which the extensible means and the associated upper leg portion and portion of the lower leg portion above the pivot therein of the upper leg portion is disposed in a triangular relationship.

3. An overhead guard as claimed in claim 1 wherein said guard canopy and upper leg portions are pivotable from an upright operative position to a rearwardly extending retracted non-operative position in which said extensible means is extended and urges the guard and upper leg portions to an operative position, forming a trinagular configuration with the respective upper leg portion and that part of the lower leg portion located between the pivoted connection thereon of the upper leg portion and the upper end thereof.

4. An overhead guard for industrial trucks having an operator's station generally centrally of the truck comprising a first upstanding rigid leg member connected fixedly to and generally centrally of each side of the truck, a second rigid leg member connected pivotally to each first leg member at a location spaced beneath the upper end portion of the first leg member, said second leg members being securable to the first leg members in upstanding positions to form a pair of transversely spaced aligned upstanding leg means with the first leg members and being pivotable rearwardly of the truck on the first leg members to retracted positions, an overhead guard portion connected to the upper ends of the second leg members and extending over the operator's compartment, and extensible means connected to the upper end portion of at least one of said first leg members and connected operatively to said overhead guard portion longitudinally intermediate the forward and rear ends thereof.

5. An overhead guard as claimed in calim 4 wherein said extensible means is a tension spring which retards rearward pivotal movement of the second leg member and assists forward pivotal movement thereof to an upstanding position, said spring being located in the plane of the first and second leg members when the second leg member is in an upright or operative position and being located out of the plane of and in a triangular relationship with the second leg member and with that portion of the first leg member above the pivotal connection thereof on the second leg member when the latter member is retracted.

6. An overhead guard as claimed in claim 4 wherein the second leg members are pivotable also forwardly of the upstanding positions thereof on the first leg members.

7. An overhead guard as claimed in claim 6 wherein yielding means is connected between the first and second leg members urging the latter from a forward pivoted position to an upstanding position, and means for selectively retaining the second leg members in a forward pivoted position or in an upstanding position.

8. An overhead guard as claimed in claim 4 wherein operator's signalling means is located at the forward end of the overhead guard portion which connects the upper ends of the second leg members, said signalling device being actuated upon contact thereof with an object.

9. An overhead guard as claimed in claim 8 wherein said signalling device is a bumper bar urged in a direction forwardly of the vehicle and actuatable rearwardly thereof.

10. An overhead guard as claimed in claim 4 wherein the overhead guard portion extends over the operator's compartment and forms with said pair of leg means when in operative position a generally T-shaped guard.

11. An overhead guard as claimed in claim 4 wherein the overhead guard forms a portion of an unitary truck body portion having a transversely extending vertical plate member secured to the first leg members a horizontal plate member secured to the vertical plate members and extending rearwardly of the truck, said horizontal plate member being adapted to function as a battery tray or support when the battery is located in operative position on the truck.

12. An overhead guard as claimed in claim 4 wherein said second leg members each comprises a pair of spaced side plates which straddle the upper end portion of each first leg member and are pivotally connected to the first leg member outwardly of the opposite sides thereof, said extensible means being mounted at one end within the space provided between the sides of each second leg member.

13. An overhead guard as claimed in claim 4 wherein said second leg members are secured in said upstanding positions by securing means, said securing means connecting each pair of said first and second leg members together at a location intermediate the location at which the second leg member pivots on the first leg member and the location at which the extensible means is connected to the first leg member.

14. An overhead guard as claimed in claim 4 wherein said second leg members and overhead guard portion when fully pivoted rearwardly of the truck remains within the longitudinal dimension of the truck.

15. An overhead guard as claimed in claim 4 wherein said extensible means is connected operatively to said overhead guard portion at a location longitudinally between the connection thereto of the adjacent second leg member and the rear end of the overhead guard portion, such that upon retraction of said overhead guard portion, said extensible means forms with the adjacent second leg member a generally X-shaped configuration.

16. An overhead guard as claimed in claim 4 wherein said extensible means is a tension spring which retards rearward pivotal movement of the second leg member and assists forward pivotal movement thereof to an upstanding position.

17. In an industrial truck a generally centrally located operator's compartment, a battery section located rearwardly of the operator's compartment, and a unitary overhead guard and body portion comprising a generally T-shaped overhead guard having upstanding support leg members mounted on opposite sides of the truck adjacent the operator's station, a transversely extending vertical plate means secured to the pair of upstanding leg members and a rearwardly extending horizontal plate means rigidly secured to the vertical plate means and forming a floor member in that portion of the truck in which the battery is located, said horizontal plate means being adapted to function as a battery tray or support when the battery is located in operative position on the truck.

18. An industrial truck as claimed in claim 17 wherein the vertical and rearwardly extending means forms a rear body portion of the truck.

* * * * *